United States Patent [19]
Kamada et al.

[11] Patent Number: 5,611,752
[45] Date of Patent: Mar. 18, 1997

[54] HYDRAULIC CONTROL SYSTEM FOR LOWERING THE DUTY RATIO WHEN THE PRESSURE IS ABOVE A PRESET PRESSURE AS A FUNCTION OF TEMPERATURE

[75] Inventors: Shinya Kamada; Toshihisa Marusue, both of Hiroshima, Japan

[73] Assignee: Madza Motor Corporation, Hiroshima-ken, Japan

[21] Appl. No.: 446,580

[22] Filed: May 19, 1995

[30] Foreign Application Priority Data

May 20, 1994 [JP] Japan .................... 6-130920

[51] Int. Cl.$^6$ .................................................. F16H 1/00
[52] U.S. Cl. .................... 477/98; 477/156; 477/174
[58] Field of Search ...................... 477/76, 97, 98, 477/156, 174

[56] References Cited

U.S. PATENT DOCUMENTS

| | | | |
|---|---|---|---|
| 4,998,449 | 3/1991 | Baba et al. | 477/98 |
| 5,261,295 | 11/1993 | Iwanaga et al. | 477/98 |
| 5,449,329 | 9/1995 | Brandon et al. | 477/76 X |

FOREIGN PATENT DOCUMENTS

| | | | |
|---|---|---|---|
| 2292567 | 12/1990 | Japan | 477/98 |
| 517430 | of 1993 | Japan . | |
| 5272622 | 10/1993 | Japan | 477/98 |
| 6229462 | 8/1994 | Japan | 477/76 |

*Primary Examiner*—Khoi Q. Ta
*Attorney, Agent, or Firm*—Sixbey, Friedman, Leedom & Ferguson, P.C.; Gerald J. Ferguson, Jr.; Donald R. Studebaker

[57] ABSTRACT

A hydraulic control system for an automatic transmission includes a three-way duty solenoid valve which is driven at a duty rate to regulate pressure at its input port and develop a controlled pressure at its output port leading to a frictional coupling element for shifting the automatic transmission to a specific mode. The duty rate is changed depending upon driving conditions so that the controlled pressure is forced to reach a desired hydraulic pressure according to driving conditions.

12 Claims, 10 Drawing Sheets

5,611,752

HYDRAULIC CONTROL SYSTEM FOR LOWERING THE DUTY RATIO WHEN THE PRESSURE IS ABOVE A PRESET PRESSURE AS A FUNCTION OF TEMPERATURE

BACKGROUND OF THE INVENTION

1. Field of the Invention

The resent invention relates to a hydraulic control system, and, more particularly, to a hydraulic control system, having a three-way solenoid valve, for an automatic transmission.

2. Description of Related Art

Typically, automatic transmissions for automobiles have torque converters and transmission gear mechanisms. Each such torque converter and transmission gear mechanism includes a plurality of frictional coupling elements which are selectively locked or coupled and are unlocked or released. Such frictional coupling elements may include clutches and brakes and are locked and unlocked so as to place the automatic transmission into desired transmission modes or ranges and gears according to driving conditions. Selectively locking and unlocking of these frictional coupling elements is performed by the use of actuators associated with the respective frictional coupling elements which are controlled by means of a hydraulic control circuit.

Hydraulic control circuits of this kind typically include various hydraulic control valves, such as, for instance, a line pressure regulator valve, a manual valve which is operated manually to change from one transmission range to another, a plurality of shift valves for selectively activating the actuators so as to provide any desired gear. In order to provide for the regulator valve optimum regulation of line pressure according to driving conditions including selected gears, some hydraulic control circuits of this kind are provided with duty solenoid valves which causes a regulator valve to turn ON and OFF periodically. If such a hydraulic control circuit includes a two-way type of duty solenoid valve which opens and closes its drain port, the duty solenoid valve is connected at the drain port to a pressure line between an orifice and a subject frictional coupling element. The duty solenoid valve is operated at a duty rate (a rate of an opened period of time relative to a period of time for one cycle of NO-OFF operation) necessary to develop a target pressure determined according to engine output.

However, as well known in the art, viscosity of working oil used in the hydraulic control circuit changes greatly due to a change in oil temperature. Specifically, the working oil tends to provide an increase in viscosity with a decrease in oil temperature. Consequently, when the duty solenoid valve is used to regulate oil pressure for operating the frictional coupling element, the frictional coupling element tends to change its operative characteristics. For example, the working oil suffers increased resistance at low temperatures, causing the duty solenoid valve to provide controlled line pressure P lower under relatively high oil temperatures than under relatively low oil temperatures.

In order for a hydraulic control circuit having the duty solenoid valve to avoid such a problem, as described in Japanese Patent Publication No. 5-17430, the duty rate may be changed so as to shorten the rate of opened period of time relative to one cycle at low oil temperatures.

With the prior art hydraulic control circuit, even when the resistance of working oil against the orifice is increased due to a drop in oil temperature, the working oil discharged from the duty solenoid valve is less decreased in amount, avoiding an excessive drop in oil pressure at low oil temperatures.

Some hydraulic control circuits of this kind include three-way type of duty solenoid valves. While such a hydraulic control circuit may have advantages over the prior art, nevertheless, a specific restraint must be imposed upon the duty rate. For the purpose of providing a brief background that will enhance an understanding of the operation of the present invention, reference is made to FIGS. 12 and 13.

Referring to FIG. 12, a three-way type of duty solenoid valve E1 has a plunger E2 disposed for axial movement in a valve housing E3. This plunger E2 with a valve head E2a moves in the axial direction so as to bring the valve head E2a into close contact selectively with valve seats E4a and E4b formed axially separated in the valve housing E3. With this selective contact of the valve head E2a with these valve seats E4a and E4b, an output port E5a, which is in communication with a related frictional coupling element, is brought into communication selectively with an input port E5b through which line pressure is introduced into the valve housing E3 and a drain port E5c. The plunger E2 is always urged by means of a coil spring E6 so as to hold the valve head E2a in close contact with the valve seat E4b, thereby keeping the input port E5b in communication with the output port E5a and disconnecting the communication of the output port E5a with the drain port E5c. A solenoid coil E7, is mounted on the valve housing E3 so as to surround the plunger stem E2b.

When the solenoid coil E7 is energized, it forces the plunger E2 against the coil spring E6 so as to bring the valve head E2a into close contact with the valve seat E4a and thereby to keep the output port E5a in communication with the drain port E5c. As long as the solenoid coil E7 is continuously energized, the plunger E2 is urged against the coil spring E6 so as to hold the valve head E2a in close contact with the valve seat E4a, thereby keeping the output port E5a in communication with the drain port E5c and disconnecting the communication of the output port E5a with the input port E5b. Periodically energizing and deenergizing the solenoid coil E7 at a duty rate causes the solenoid valve changes an input oil pressure at the input port E5b as a regulated output oil pressure at the output port E5a according to the duty rate.

As shown by a solid line in FIG. 13, under high oil temperatures at which the working oil has relatively high viscosity, the solenoid valve provides a regulated or controlled line pressure P which decreases at a substantially constant incline with an increase in duty rate after an insensitive range of duty rates. On the other hand, when the duty rate is low so as thereby to disconnect the communication of the drain port E5c with the output port E5a for a relatively long period of time under low oil temperatures at which the working oil has relatively low viscosity, the solenoid valve causes a reduction of discharged oil in amount through the drain port E5c, providing the controlled line pressure P at the output port E5c increased as compared with that under high oil temperatures.

Conversely, when the duty rate is high so as thereby to disconnect the communication of the drain port E5c with the output port E5a for a relatively short period of time under low oil temperatures, the solenoid valve causes a reduction of introduced oil in amount through the input port E5b, providing the controlled line pressure P at the output port E5c decreased as compared with that under high oil temperatures.

As shown by a dotted line in FIG. 13, in a range of relatively low oil temperatures, the controlled line pressure P is changed relatively lower in a range of duty rates D, greater than a predetermined specific duty rate Da, than in a range of relatively high oil temperatures. For example, if controlled line pressure of a level Pa is given for a duty rate Db less than the specific duty rate Da at higher oil temperatures, the controlled line pressure P changes higher from the level Pa to a level Pb for the same duty rate Db. On the other hand, if line pressure of a level Pc is given for a duty rate Dc greater than the specific duty rate Da at higher oil temperatures, the controlled line pressure P changes lower from the level Pc to a level Pd for the same duty rate Db.

Consequently, the level of controlled line pressure necessary to activate the related frictional coupling element is relatively higher as compared with the level of desired line pressure, causing the frictional coupling element to produce shocks during coupling or relatively lower as compared with the level of desired line pressure, prolonging a time necessary for the automatic transmission to perform shift operation.

SUMMARY OF THE INVENTION

It is an object of the present invention to provide a hydraulic control system, having a three-way type of duty solenoid valve, which performs shift control of an automatic transmission with a high accuracy.

The foregoing object of the present invention is accomplished by providing a hydraulic control system, for an automatic transmission, which includes a three-way type of solenoid valve such as operated with a duty rate so as to regulate input line pressure at its input port and develop a controlled pressure at its output port leading to a frictional coupling element, such as a lock-up clutch of a torque converter, related to the solenoid valve for shifting the automatic transmission to specific one of possible modes. The duty rate is changed depending upon driving conditions so that the controlled pressure is forced to reach a desired hydraulic pressure according to driving conditions.

The hydraulic control system changes the duty rate so as to change a period of time, for which the drain port is closed in a range of target hydraulic pressure less than a predetermined pressure, shorter when viscosity of a hydraulic fluid higher is higher than a specific value of viscosity than when it is lower than the specific value of viscosity.

Otherwise, the hydraulic control system changes the duty rate so as to change the closed period of time in a range of desired hydraulic pressure greater than the predetermined pressure longer when viscosity of the working oil is higher than the specific value of viscosity than when it is lower than the specific value of viscosity.

With the hydraulic control system of the present invention, the solenoid valve suppresses an increase in the controlled pressure in a range of duty rates at which the drain port is closed for a relatively long period of time and a reduction in the controlled pressure in a range of duty rates at which the drain port is closed for a relatively short period of time, providing the controlled pressure corresponding to a desired target pressure with a high precision.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
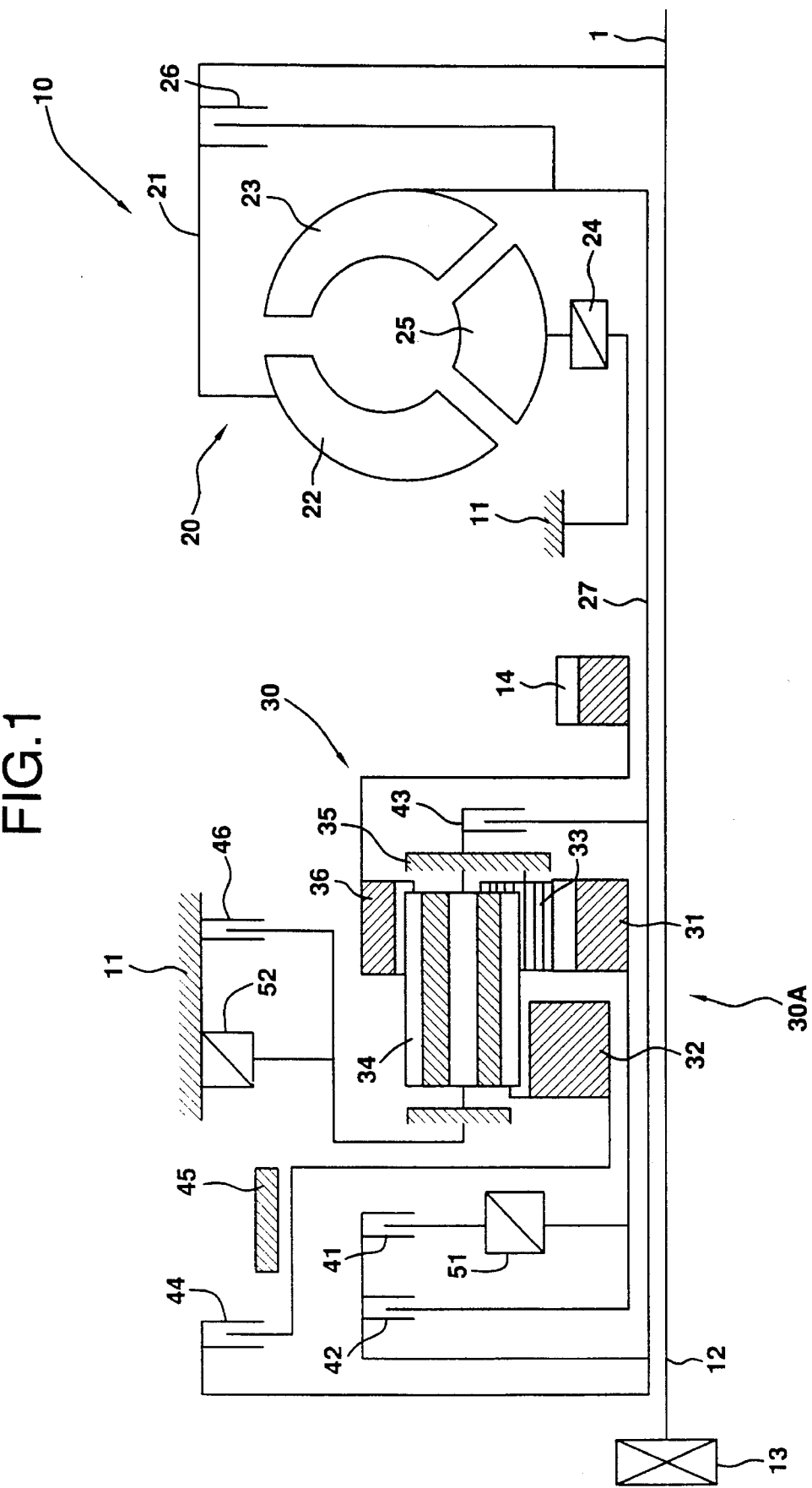
FIG. 1 is a schematic illustration of an automatic transmission with which a control system of the present invention cooperates.

Referring now to the drawings in detail, and in particular, to FIG. 1, an automatic transmission 10 equipped with a control system in accordance with a preferred embodiment of the present invention has a mechanical configuration including a torque converter 20 and a transmission gear mechanism 30. This transmission gear mechanism 30 includes various frictional coupling elements 41–46, such as clutches and brakes, and one-way clutches 51 and 52 which are selectively activated so as to place the transmission gear mechanism 30 into desired ranges and gears, namely a drive (D) range, a second speed (S) range, a low speed (L) range, a reverse (R) range, first (1st) gear to fourth (4th) gear in the drive (D) range, first (1st) gear to third (3rd) gear in the second speed (S) range and first (1st) and second (2nd) gear in the low speed (L) range.

The torque converter 20, which multiplies engine torque, has driving and driven tori generally referred to as a pump 22 and a turbine 23, respectively, and a stator 25. The pump 22 is placed within and secured to a housing 21 secured to a pump shaft 12. The turbine 23, which is secured to a hollow turbine shaft 27 functioning as an input shaft of the transmission gear mechanism 30, is placed within the housing 21, so as to face the pump 22 and driven by the pump 22 by means of a special lightweight oil. The stator 25 is inserted between the pump and turbine 22 and 23 and mounted on a transmission housing 11 through a one-way clutch 24 so as to be allowed to spin in the direction of the pump 22. As is well known to those skilled in the art, the stator 25 intercepts the oil thrown off by the turbine 23 and redirects the path of this oil so as to cause the oil to enter the pump 23 smoothly, thereby performing engine output torque transmission and multiplication. The torque converter 20 further has a lock-up clutch 26 placed between the housing 21 and the turbine 23 for mechanically locking the pump 22, and, hence, the pump shaft 12, and the turbine 23 together when it is activated. An engine output shaft 1 is directly connected to, or otherwise formed integrally with, the pump shaft 12 and extends so as to pass through the hollow turbine shaft 27. The engine output shaft 1 also drives an oil pump 13 disposed at the rear end of the automatic transmission 10 opposite to the torque converter 20 with respect to the transmission gear mechanism 30. By means of this torque converter 20, engine output torque is multiplied and transmitted to the transmission gear mechanism 30.

The transmission gear mechanism 30 is comprised of a Labinyo type of planetary gear 30A, various frictional coupling elements 41–46, such as clutches and brakes, and one-way clutches 51 and 52. The planetary gear 30A comprises a small sun gear 31, a large sun gear 32 having a diameter larger than that of the small sun gear 31, a plurality of short pinion gears 33, a long pinion gear 34 longer in axial length and larger in diameter than the short pinion gear 33, a carrier 35 and a ring gear 36. These small and large sun gears 31 and 32 are loosely mounted for rotation on the turbine shaft 27 side by side in order from the torque converter 20. The small pinion gears 33 are arranged around and in external engagement with the small sun gear 31. The long pinion gear 34 is in engagement with both short pinion gears 33 and large sun gear 32 and in external engagement with the ring gear 36. These short pinion gears 33 and long pinion gear 34 are independently supported for rotation by the carrier 35.

Various frictional coupling elements are provided, including a forward clutch (FWD) 41 and a coast clutch (CST) 42 disposed in parallel with each other between the turbine shaft 27 and the small sun gear 31, a third-fourth (3-4) clutch 43 disposed between the turbine shaft 27 and the carrier 35, a reverse clutch (RVS) 44 disposed between the turbine shaft 27 and the large sun gear 32, a second-fourth (2-4) brake 45, such as a band brake disposed between large sun gear 32 and the reverse clutch 44, for braking the large sun gear 32, and a low-speed-reverse (L-R) brake (LRV) 46 disposed between the small sun gear 31 and the forward clutch 41. Further, a first one-way clutch (FOW) 51 is disposed in series with the forward clutch 41 between the small sun gear 31 and the forward clutch 41, and a second one-way clutch (SOW) 52 is disposed in parallel with the L-R brake 46 between the carrier 35 and the transmission housing 11.

These frictional coupling elements 41–46 and one-way clutches 51 and 52 are selectively activated so as to place the transmission gear mechanism 30 into desired gears, for instance first (1st) gear to fourth (4th) gear in a drive (D) range, first (1st) gear to third (3rd) gear in a second speed (S) range and first (1st) and second (2nd) gear in a low speed (L) range, as shown in Table I.

TABLE I

| Range/Gear | CLUTCH | | | | BRAKE | | ONE-WAY CLUTCH | |
| --- | --- | --- | --- | --- | --- | --- | --- | --- |
| | FWD | CST | 3/4 | RVS | 2/4 | LRV | FOW | SOW |
| Park (P) | | | | | | | | |
| Reverse (R) | | | | o | | o | | |
| Neutral (N) | | | | | | | | |
| Drive (D) | | | | | | | | |
| 1st | o | | | | | | o | o |
| 2nd | o | | | | o | | o | |
| 3rd | o | o | o | | | | o | |
| 4th | o | | o | | o | | | |
| Second (S) | | | | | | | | |
| 1st | o | | | | | | o | o |
| 2nd | o | o | | | o | | o | |
| 3rd | o | o | o | | | | o | |
| Low (L) | | | | | | | | |
| 1st | o | | | | | o | o | o |
| 2nd | o | o | | | o | | o | |

Specifically, in the 1st gear, the forward clutch 41 and the first and second one-way clutches 51 and 52 are locked, causing the transmission of output torque from the torque converter 20 to the small sun gear 31 of the planetary gear 30A through the turbine shaft 27 via the forward clutch 41 and the first one-way clutch 51. In this instance, the locked second one-way clutch 52 holds the carrier 35 of the planetary gear 30A operationally fixed with respect to the transmission housing 11, causing the planetary gear 30A to serve as a stable gear train which does not cause any differential motion for the transmission of output torque from the torque converter 20 to the ring gear 36 through the short and long pinion gears 33 and 34 via the small sun gear 31. As a result, in the 1st gear, the transmission gear mechanism 30 provides the largest reduction ratio corresponding to the ratio of diameter between the small sun gear 31 and the ring gear 36.

In the 2nd gear, the 2-4 brake 45 is applied simultaneously with unlocking of the second one-way clutch 52 while the forward clutch 41 and the first one-way clutch 51 are held locked. This disables the large sun gear 32 from rotating, so as to cause the transmission of output torque from the torque converter 20 to the long pinion gear 34 through the turbine shaft 27 via the small sun gear 31 and the short pinion gear 33. At this time, because the long pinion gear 34 remains in engagement with the large sun gear 32 disabled in rotation by the 2-4 brake 45, it rotates around the large sun gear 32 and is accompanied by the carrier 35. This causes an increase in the rotation of the ring gear 36 corresponding to rotation of the carrier 35 as compared with when the transmission gear mechanism 30 is in the 1st gear, providing the transmission gear mechanism 30 in the 2nd gear with a reduction ratio smaller than in the 1st gear.

When the transmission gear mechanism 30 is placed into the 3rd gear, simultaneously with unlocking or releasing of the 2-4 brake 45, both coast clutch 42 and 3-4 clutch 43 are locked. As a result, transmission of output torque from the torque converter 20 is connected to the carrier 35 through the 3-4 clutch 43 as well as to the small sun gear 31 through the turbine shaft 27 via the forward clutch 41 and the first one-way clutch 51. This causes the planetary gear 30A to rotate as a whole at the same rotational speed as the turbine 23 of the torque converter 20 through the turbine shaft 27.

Further, in the 4th gear, the 2-4 brake 45, having been unlocked or released for the 3rd gear, is locked again, the transmission of output torque from the torque converter 20 is connected to the carrier 35 through the turbine shaft 27 via the 3-4 clutch 43, causing the long pinion gear 34 to rotate around the large sun gear 32 along with the carrier 35 and on its axis. As a result, the planetary gear 30A causes an increase in the rotation of the ring gear 36 by the total of the rotation of the carrier 35 on the axis of the turbine shaft 27 and the rotation of the long pinion gear 34 on its axis, placing the transmission gear mechanism 30 in the overdrive 4th gear.

In the reverse (R) range, both reverse clutch 44 and L-R brake 46 are locked or applied, connecting the transmission of output torque from the torque converter 20 through the turbine shaft 27 to the large sun gear 32 with the carrier 35 operationally fixed. This brings the large sun gear 32, the long pinion gear 34 and the ring gear 36 into a steady gear train, so that the transmission gear mechanism 30 in the reverse (R) range provides a reduction ratio corresponding to the ratio of diameters of the large sun gear 32 and the ring gear 36. It is apparent that the ring gear 36 rotates in the direction opposite to the direction in which the large sun gear 32, and hence the turbine shaft 27, rotates.

In this instance, because the first one-way clutch 51, which connects the transmission of output torque from the torque converter 20 through the turbine shaft 27 in the 1st, 2nd or 3rd gear, and the second one-way clutch 52, which receives reaction force in the 1st gear, are unlocked during coasting, engine brake is not available in these gears. However, engine brake is applied by locking the coast clutch 42 in parallel with the first one-way clutch 51 at the 3rd gear in the drive (D) range, the 2nd and 3rd gears in the second speed (S) range, and the 1st and 2nd gears in the low speed (L) range, and by locking the L-R brake 46 in parallel with the second one-way clutch 52 in the 1st gear in the low speed (L) range.

These frictional coupling elements 41–46 are activated by means of hydraulically controlled actuators (referred to as actuators for simplicity) which are selectively operated by a hydraulic control circuit 60.

Figure 2:
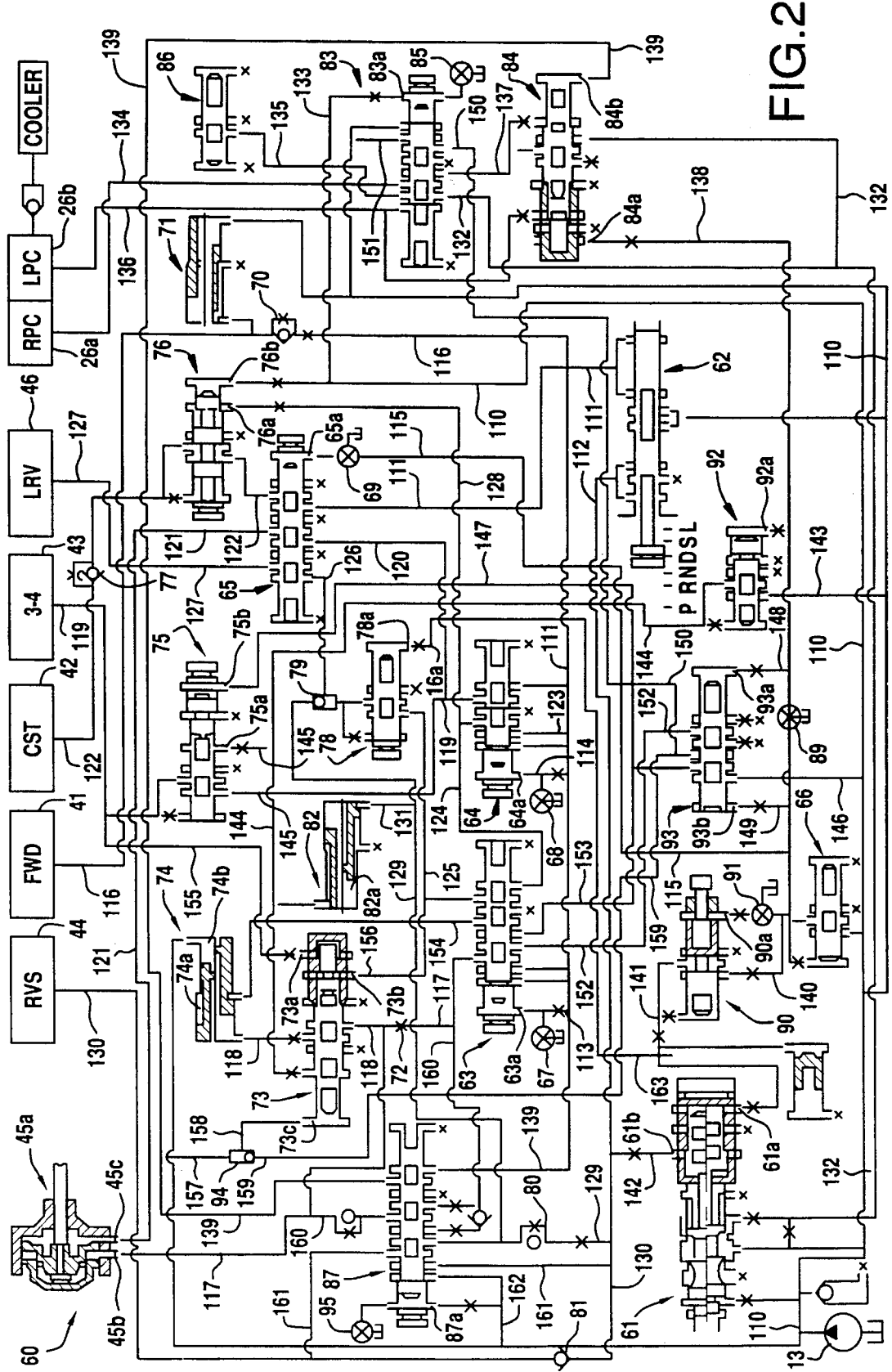
FIG. 2 is a diagram showing a hydraulic control circuit in accordance with a preferred embodiment of the present invention for the automatic transmission shown in FIG. 1.

Referring to FIG. 2, the hydraulic control circuit 60, which cooperates with the automatic transmission 10 includes various actuators. One of the actuator, namely a 2–4 brake actuator 45a for the 2–4 brake 45 comprises a servo valve having a brake apply pressure port (which is referred to as a brake apply port for simplicity) 45b and a brake release pressure port (which is referred to as a brake release port for simplicity) 45c, which may take any type well known to those skilled in the art. This type of servo valve actuator 45a operates such that it activates the 2–4 brake 45 so that it locks for brake application under the application of hydraulic pressure to the brake apply port 45b only and unlocks for brake release when both brake apply and brake release ports 45b and 45c are supplied with hydraulic pressure and when neither the brake apply port 45b nor the brake release port 45c is supplied with any hydraulic pressure. Each of the actuators, other than the 2–4 brake servo valve actuator 45a, comprises an ordinary hydraulically controlled piston which may take any type well known to those skilled in the art. The hydraulic control circuit 60 further includes various valves, such as a regulator valve 61 for regulating pressure of a working oil discharged into a main pressure line 110 from the oil pump 13 to a certain level of line pressure, a manual valve 62 which is manually operated to selectively place the automatic transmission 10 into any desired range, and first, second and third shift valves 63, 64 and 65 for selectively activating the frictional coupling elements 41–46 according to gear shifts to possible gears.

The manual valve 62 is manually operated to select three forward ranges, namely the drive (D) range, the second speed (S) range and the low speed (L) range. It further selects the reverse (R) range, the neutral (N) range and the park (P) range. The manual valve 62 is configured such that it brings the main pressure line 110 into communication with a forward pressure line 111 when selecting any one of the forward ranges and with a reverse pressure line 112 when selecting the reverse (R) range.

The first and second shift valves 63 and 64 are provided at their one end with control ports 63a and 64a, respectively, which are in communication with the forward pressure line 111 through first and second control pressure lines 113 and 114, respectively. Similarly, the third shift valve 65 is provided at its one end with a control port 65a which is in communication with the main pressure line 110 through a third control pressure line 115 via a reducing valve 66. These first to third control pressure lines 113 to 115 are provided with first to third solenoid valves (SLDVs) 67, 68 and 69, respectively, for gear shifts. The first solenoid valve 67 operates such that it drains a control pressure from the first shift valve 63 at the control port 63a when energized or turned ON so as to displace its spool to the one end in the left hand side position (which is referred to as a left end position) as viewed in FIG. 2 and introduces a control pressure into the first shift valve 63 at the control port 63a through the first control pressure line 113 when deenergized or turned OFF so as to displace the spool to another end in the right hand side position (which is referred to as a right end position) as viewed in FIG. 2 against a spring (not shown). Similarly, the second solenoid valve 68 operates such that it drains a control pressure from the second shift valve 64 at the control port 64a when energized or turned ON so as to displace its spool in the left end position and introduces a control pressure into the second shift valve 64 at the control port 64a through the second control pressure line 114 when deenergized or turned OFF so as to displace the spool in the right end position against a spring (not shown). On the other hand, the third solenoid valve 69 operates such that it drains a control pressure from the third shift valve 65 at the control port 65a when energized or turned ON so as to displace its spool in the right end position and introduces a control pressure into the third shift valve 65 at the control port 65a through the third control pressure line 115 when deenergized or turned OFF so as to displace the spool in the left end position against a spring (not shown). These first to third solenoid valves (SLDVs) 67 to 69 are energized and deenergized or turned ON and OFF by a controller (which will be described in detail later) in various operative patterns predetermined according to vehicle speeds and engine throttle openings so as to selectively activate the frictional coupling elements 41 to 46 as shown in Table I for shifting the automatic transmission 10 into the 1st to 4th gears. The operative patterns of the solenoid valves 67–69 are shown in Table II.

TABLE II

| Range | D Range | | | | S Range | | | L Range | |
|---|---|---|---|---|---|---|---|---|---|
| Gear | 1st | 2nd | 3rd | 4th | 1st | 2nd | 3rd | 1st | 2nd |
| 1st SLDV | OFF | ON | ON | ON | OFF | ON | ON | OFF | ON |
| 2nd SLDV | ON | ON | OFF | OFF | ON | ON | OFF | ON | ON |
| 3rd SLDV | ON | ON | OFF | ON | ON | OFF | OFF | OFF | OFF |

A forward clutch pressure line 116 branches off from the forward pressure line 111 which is brought into communication with the main pressure line 110 when the manual valve 62 is operated so as to select any one of the forward ranges, namely the drive (D) range, the second speed (S) range and the low speed (L) range, and leads to the forward clutch 41. Through the forward clutch pressure line 116, the forward clutch 41 is always applied with locking pressure in each of the drive (D) range, the second speed (S) range and the low speed (L) range. In this instance, the forward clutch pressure line 116 is connected to a neutral-drive (N/D) accumulator 71 downstream from the one-way orifice 70.

The forward pressure line 111, leading to the first shift valve 63, is brought into communication with a brake apply pressure line 117 when the first shift valve 63 is forced to displace its spool into the left end position resulting from energization of the first solenoid valve 67, so as to introduce hydraulic pressure into the 2–4 brake servo valve actuator 45a at the brake apply port 45b via a two-way orifice 72. Consequently, when the first solenoid valve 67 is energized or turned ON in the forward ranges, in other words, when hydraulic pressure is introduced into the 2–4 brake servo valve actuator 45a only at the brake apply port 45b at the 2nd, 3rd or 4th gear in the drive (D) range, at the 2nd or 3rd gears in the second speed (S) range, and at the 2nd gear in the low speed (L) range, the 2–4 brake 45 is applied. The brake apply pressure line 117 is connected to a first-second (1–2) accumulator 74 through a pressure line 118 having an accumulation cut valve 73. The forward pressure line 111 also leads to the second shift valve 64 and is brought into communication with a third-fourth (3–4) clutch pressure line 119 when the second shift valve 64 is forced to displace its spool into the right end position resulting from deenergization of the second solenoid valve 68. This 3–4 clutch pressure line 119 leads to the 3–4 clutch 43 via a 3–4 clutch control valve 75. Consequently, when the second solenoid valve 68 is deenergized or turned OFF in the forward ranges, in other words, at the 3rd or 4th gear in the drive (D) range and at the 3rd gear in the second speed (S), the 3–4 clutch 43 is locked.

A pressure line 120 leads to the third shift valve 65 and is brought into communication with a brake release pressure line 121 when the third shift valve 65 is forced to displace its spool into the left end position resulting from deenergization of the third solenoid valve 69, so as to introduce hydraulic pressure into the 2–4 brake servo valve actuator 45a at the brake release port 45c via. Consequently, when the second and third solenoid valves 68 and 69 are deenergized or turned OFF in the forward ranges, in other words, when hydraulic pressure is introduced into the 2–4 brake servo valve actuator 45a only at the brake release port 45c at the 3rd gear in the drive (D) range, and at the 3rd gears in the second speed (S) range, the 2–4 brake 45 is released.

In this instance, the forward pressure line 111 further leads to the third shift valve 65 and is brought into communication with a coast pressure line 122 leading to the coast clutch 42 via a coast pressure control valve 76 and a one-way orifice 77 when the third shift valve 65 is forced to displace its spool into the right end position resulting from deenergization of the third solenoid valve 69. Consequently, when the third solenoid valve 69 is deenergized or turned OFF in the forward ranges, in other words, at the 3rd gear in the drive (D) range, at the 2nd or 3rd gear in the second speed (S) range, and the 1st or 2nd gear in the low speed (L) range, the coast clutch 42 is unlocked.

A pressure line 123, branching off from the forward pressure line 111 and leading to the second shift valve 64, is brought into communication with a pressure line 124 leading to the first shift valve 63 when the second shift valve 64 is forced to displace its spool into the left end position resulting from energization of the second solenoid valve 68. On the other hand, a pressure line 125, which is connected to the first shift valve 63 and brought into communication with the pressure line 124 when the first shift valve 63 is forced to displace its spool into the right end position resulting from deenergization of the second first solenoid valve 67, leads to the third shift valve 65 through a pressure line 126 via a low reducing valve 78 and a ball valve 79. This pressure line 126 is brought into communication with a L-R brake pressure line 127 connected to the L-R brake 46 when the third shift valve 65 is forced to displace its spool into the left end position resulting from deenergization of the third solenoid valve 69. In other words, the first to third solenoid valves 67 to 69 are in their deenergized, energized and deenergized states or turned-OFF, turned-On and turned-Off states, respectively, in the forward ranges, in other words, at the 1st gear in the low speed (L) range, the L-R brake 46 is locked or applied.

In this instance, the coast pressure control valve 76 has a pressure reduction control port 76a which is connected to a pressure line 128, branching off from the pressure line 124 which is brought into communication with the forward pressure line 111 through the pressure line 123 when the second shift valve 64 is forced to displace its spool into the left end position resulting from energization of the second solenoid valve 68, and a back pressure port 76b which is always supplied with a line pressure from the main pressure line 110.

Describing the operation of the coast pressure control valve 76, at specific gears, such as the 2nd gear in the second speed (S) range and the 1st or 2nd gear in the low speed (L) range where the second solenoid valve 68 is in the energized or ON state while the coast clutch 42 is locked, the coast pressure control valve 76 is supplied with a line pressure from the forward pressure line 111 at the pressure reduction control port 76a simultaneously with a line pressure from the main pressure line 110 at the back pressure port 76b. This simultaneous pressure supply suppresses a reduction in coast pressure, causing the coast clutch 42 to increase its torque capacity. On the other hand, at other gears, namely the 3rd gear in the drive (D) range and the 3rd gear in the second speed (S) range where the coast clutch 42 is the locked state, the coast pressure control valve 76 is not supplied with any line pressure at the pressure reduction control port 76a but with a line pressure from the main pressure line 110 at the back pressure port 76b. Consequently, the coast pressure control valve 76 provide a less reduction in coast pressure, causing the coast clutch 42 to reduce its torque capacity.

A pressure line 129, branching off from the reverse pressure line 112 which is in communication with the main pressure line 110 in the reverse (R) range, leads to the ball valve 79 via a one-way orifice 80. This pressure line 129 is brought into communication with the L-R brake pressure line 127 through the pressure line 126 when the third shift valve 65 is forced to displace its spool into the left end position resulting from deenergization of the third solenoid valve 69. Further, the reverse pressure line 112 serves as a reverse clutch pressure line 130 leading to the reverse clutch 44 via a check valve 81. Consequently, in the reverse (R) range, the reverse clutch 44 is always locked, while the L-R brake 46 is locked or applied, when the third solenoid valve 69 is deenergized or turned OFF. A pressure line 131, branching off from the pressure line 129 between the one-way orifice 80 and the ball valve 79, is provided with a neutral-reverse (N-R) accumulator 83.

The hydraulic control circuit 60 further includes a lock-up shift valve 83 and a lock-up control valve 84 for operating the lock-up clutch 26 of the torque converter 20. A converter control pressure line 132, extending from the regulator valve 61, is connected to both lock-up shift valve 83 and lock-up control valve 84. Further, a pressure line 133, branching off from the main pressure line 110, is connected to the lock-up shift valve 83 at its control port 83a where a fourth solenoid valve 85 is connected. The lock-up shift valve 83 is forced to place its spool into the left end position when the fourth solenoid valve 85 is deenergized or turned OFF so as to bring the converter control pressure line 132 into communication with a release pressure line 135 leading to a release pressure chamber (RPC) 26a of the torque converter 20. The converter control pressure line 135 leads to a relief valve 86 through a pressure line 135. When the release pressure chamber (RPC) 26a is supplied with working oil as a control pressure, the lock-up clutch 26 is unlocked so as to release the torque converter 10 and enable it to allow slippage. On the other hand, when the fourth solenoid valve 85 is energized or turned ON and drains the working oil from the lock-up shift valve 83 through the control port 84a, the lock-up shift valve 83 allows the spool to move into the right end position, bringing the converter shift pressure line 132 into communication with a lock-up pressure line 136 leading to a lock-up pressure chamber (LPC) 26b of the torque converter 20. When the lock-up pressure chamber (LPC) 26b is supplied with working oil, the lock-up clutch 26 is locked so as to mechanically lock the pump and turbine 22 and 23 of the torque converter 10 together. At this time, the release pressure line 134 is brought into communication with a connecting pressure line 137 leading to the lock-up control valve 84 through the lock-up shift valve 84, applying working oil pressure regulated in pressure level by the lock-up control valve 84 as a release pressure to the release pressure chamber (RPC) 26a of the lock-up clutch 26. In other words, the lock-up control valve 84 is connected at the control port 84a provided at one end thereof to a control pressure line 138 leading from the main pressure line 110 via the reducing valve 66 and at a regulation-interruption port 84b provided at another end thereof to a regulation-interruption pressure line 139 leading to the forward pressure line 111.

A three-way type of first duty solenoid valve 89 provided in the control pressure line 138 regulates the control pressure to be supplied to the lock-up control valve 84 at the control port 84a according to duty rates at which it periodically opens and closes. On condition of no supply of line pressure to the lock-up control valve 84 at the regulation-interruption port 84b through the regulation-interruption pressure line 139, the first duty solenoid valve 89 regulates the difference between a lock-up pressure supplied into the lock-up pressure chamber (LPC) 26b of the lock-up clutch 26 through the converter control pressure line 132 and the lock-up pressure line 136 and a release pressure supplied into the release pressure chamber (RPC) 26a of the lock-up clutch 26 through the release pressure line 134 and the connecting pressure line 137, placing the lock-up clutch 26 to allow slippage. On the other hand, when line pressure is supplied to the lock-up control valve 84 at the regulation-interruption port 84b through the regulation-interruption pressure line 139, the lock-up control valve 84 holds its spool displaced in the left end position, so as to drain the working pressure in the release pressure chamber (RPC) 26a of the torque converter 20 through the release pressure line 134 and the connecting pressure line 137 via the lock-up shift valve 84, thereby completely locking the lock-up clutch 26.

The hydraulic control circuit 60 also includes a pressure modulator valve 90 for controlling the line pressure regulated by the regulator valve 61 and a three-way type of second duty solenoid valve 91 for causing the modulator valve 90 to perform pressure modulation. This pressure modulator valve 90 is connected to a pressure line 140 leading to the main pressure line 110 through the reducing valve 66. A control pressure regulated by the second duty solenoid valve 91 is introduced into the modulator valve 90 at its control port 90a so as to cause the modulator valve 90 to produce a modulated pressure according to duty rates. In this instance, the duty rate is established according, for instance, to engine throttle openings. This modulated control pressure corresponding to an engine throttle opening is introduced into the regulator valve 61 at its first pressure increase port 61a through a pressure line 141, causing the regulator valve 61 to increase the line pressure according to an increase in throttle opening. On the other hand, the regulator valve 61 is connected at its second pressure increase port 61b to a pressure line 142 branching off from the reverse pressure line 112 so as to increase the line pressure so that it is higher in the reverse (R) range.

The control pressure which is regulated as lock-up pressure for the lock-up clutch 26 by the first duty solenoid valve 89 is also introduced into an accumulation control valve 92 at its control port 92a. This accumulation control valve 92 regulates the line pressure introduced therein through a pressure line 143 branching off from the main pressure line 110 according to the control pressure regulated by the first duty solenoid valve 89 and supplies the regulated control pressure into a back pressure chamber 82a of the N-R accumulator 82 through a pressure line 144.

The 3–4 clutch control valve 75 provided in the 3–4 clutch pressure line 119 is connected at its control port 75a to a pressure line 145 branching off from the pressure line 144, so that the first duty solenoid valve 89 controls the locking pressure for the 3–4 clutch which is regulated by the 3–4 clutch control valve 75. This configuration reduces the number of parts necessary for the hydraulic circuit 60. On the other hand, the 3–4 clutch control valve 75 is connected at its regulation-interruption port 75b to a regulation-interruption pressure line 147 leading to the main pressure line 110 through a pressure line 146 via a lock valve 93. When the lock valve 93 communicates the regulation-interruption pressure line 147 with the pressure line 146, the line pressure is introduced into the 3–4 clutch control valve 75 at the regulation-interruption pressure port 75b from the main pressure line 110 so as to interrupt the regulative operation of the 3–4 clutch control valve 75. More specifically, the lock valve 93 is connected at its control port 93a at its one end to a pressure line 148 branching off from the control pressure line 138 downstream from the first duty solenoid valve 89 and at a balancing port 93b at another end thereof to a pressure line 149 branching off from the control pressure line 138 upstream from the first duty solenoid valve 89. The lock valve 93 forces its spool to the left end position when the control pressure produced by the first duty solenoid valve 89 is above a predetermined level, it brings the regulation-interruption pressure line 147 into communication with the main pressure line 110 through the pressure line 146.

The lock valve 93 is further connected to a pressure line 150 which is brought into communication with the regulation-interruption pressure line 147 when the lock valve 93 forces the spool to the right end position and also with a pressure line 151 leading to the main pressure line 110 through the pressure line 133 when the lock-up shift valve 83 forces the spool to the right end position. In other words, when the locking pressure of the lock-up clutch 26 is controllable during energization or turning ON of the fourth solenoid valve 85, the line pressure is introduced into the regulation-interruption pressure line 147 through the pressure lines 151 and 150 via the lock-up shift valve 83 from the main pressure line 110, so as to prevent the 3–4 control valve 75 from regulating the pressure to the 3–4 clutch 43. The lock valve 93 is further connected to a drain line 152 which is brought into communication with the brake apply pressure line 117 when the first shift valve 63 places the spool in the right end position. By means of shifting the spool of lock valve 93 brings the drain line 152 into communication selectively with two drain ports having different drain rates, changing the rate of discharge of working oil from the brake apply port 45b of the 2–4 brake servo valve actuator 45a by means of controlling the first duty solenoid valve 89.

On the other hand, the first shift valve 63 is connected to a pressure line 153 branching off from the regulation-interruption pressure line 147 and when it places its spool in the left end position while the first solenoid valve 67 is energized or turned ON, it brings the pressure line 153 into communication with a pressure line 154 leading to a first back pressure chamber 74a of the 1–2 accumulator 74 whose first back pressure chamber 74b is always supplied with the line pressure from the main pressure line 110. Accordingly, while the regulation-interruption pressure line 147 is supplied with a line pressure, the line pressure is also supplied into both first and second back pressure chambers 74a and 74b of the 1–2 accumulator 74 through the pressure lines 153 and 154 always when the first shift valve 63 holds the spool in the left end position, increasing the back pressure of the 1–2 accumulator 74.

The accumulation cut valve 73 is connected at its first control port 73a provided at its one end to a pressure line 155 branching off from the 3–4 clutch pressure line 119 downstream from the 3–4 control valve 75 and at its second control port 73b provided at the intermediate portion thereof to a pressure line 156 branching off from the pressure line 125 which leads to the L-R brake pressure line 127 via the low reducing valve 78, the ball valve 79, the pressure line 126 and the third shift valve 65. The accumulation cut valve 73 is further connected at its accumulation resumption port 73c provided at its another end to the regulation-interruption pressure line 139 through pressure lines 157 and 158 via a ball valve 94. When the accumulation cut valve 73 is supplied with working pressure at the accumulation resumption port 73c, it forces its spool to the right end position, bringing the brake apply pressure line 117 into communication with the 1–2 accumulator 74 through the pressure line 118. However, when the accumulation cut valve 73 is supplied with working pressure either at the first control port 73a or at the second control port 73b without being supplied with working pressure at the accumulation resumption port 73c, it forces its spool to the left end position, bringing the pressure line 118 on the side of the accumulator 74 into communication with the drain port. In this instance, the accumulation cut valve 73 is connected at the accumulation resumption port 73c to a pressure line 159, leading to the lock valve 93, through the pressure line 158 via the ball valve 94.

The hydraulic control circuit 60 further includes a bypass valve 87 which is connected to a first bypass pressure line 160 bypassing the orifice 72 disposed in the brake apply pressure line 117, a second bypass pressure line 161 bypassing the check valve 81 disposed in the reverse clutch pressure line 130 and the regulation-interruption pressure line 139 leading to the lock-up control valve 84 and is further connected at its control port 87a to a control pressure line 162 branching off from the main pressure line 110. This bypass valve 87 is provided with and cooperates a fifth solenoid valve 95 so as to shift its spool between its extreme positions, thereby connecting and disconnecting the communication of the regulation-interruption pressure line 139 with the bypass pressure lines 160 and 161. With deenergization or turning OFF of the fifth solenoid valve 95, the bypass valve 87 places its spool in the right end position so as to connect the communication of the regulation-interruption pressure line 139 with the first bypass pressure line 160 and to disconnect the communication of the regulation-interruption pressure line 139 with the second bypass pressure line 161. On the other hand, with energization or turning ON of the fifth solenoid valve 95, the bypass valve 87 places its spool in the left end position so as to disconnect the communication of the regulation-interruption pressure line 139 with the first bypass pressure line 160 and to connect the communication of the regulation-interruption pressure line 139 with the second bypass pressure line 161.

Figure 3:
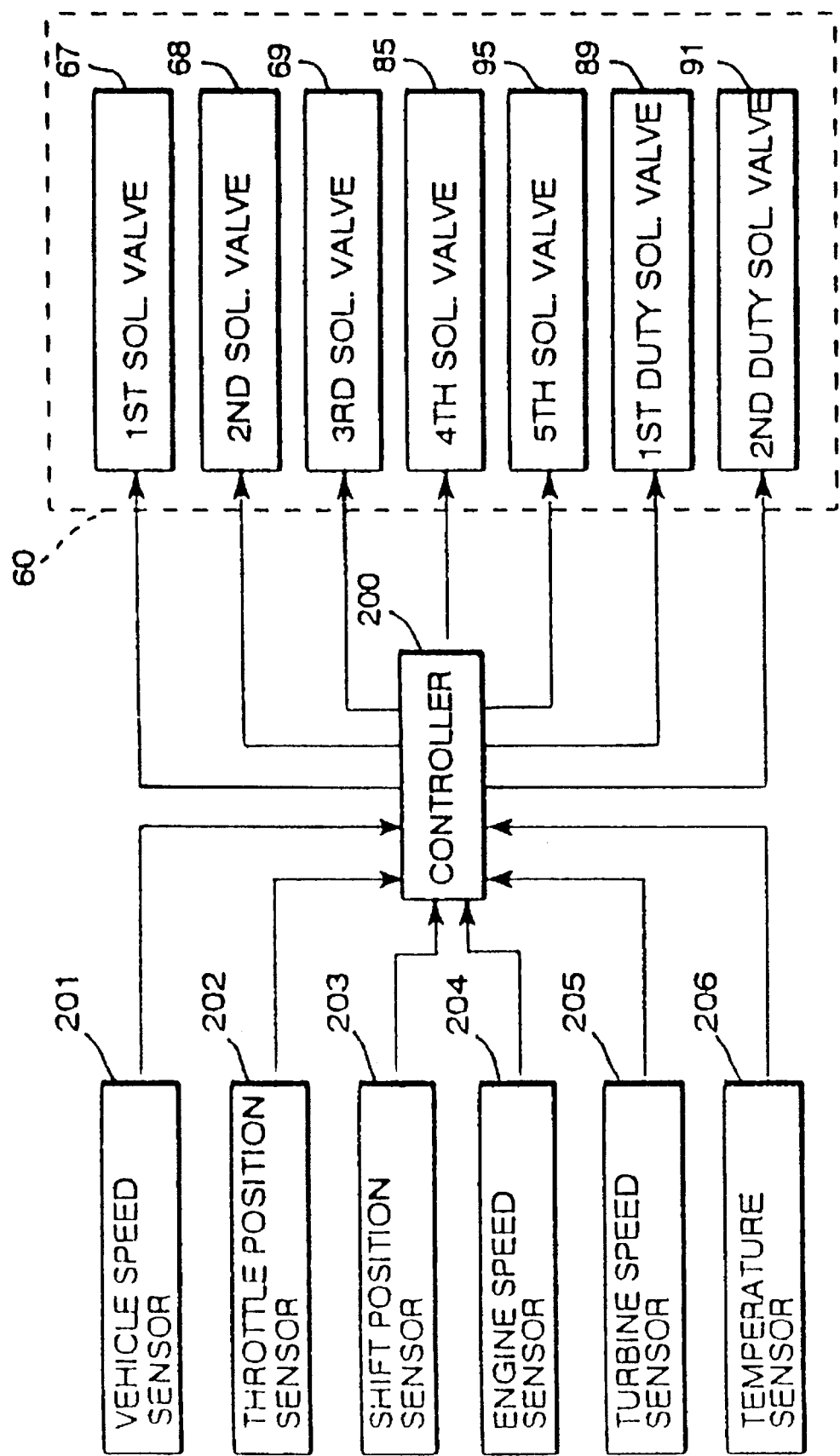
FIG. 3 is a block diagram showing a controller for various valves of the hydraulic control circuit of FIG. 2.

These solenoid valves 6–69, 85, 89, 91 and 95 are operated by means of a controller 200, comprising mainly a microcomputer, shown in FIG. 3.

Referring to FIG. 3, the controller 200 receives various signals, such as a vehicle speed signal from a speed sensor 201, a throttle opening signal from a throttle position sensor 202, a transmission shift position signal from a position sensor 203, an engine speed signal from a speed sensor 204, a turbine speed signal from a speed sensor 205, and a transmission oil temperature signal from a temperature sensor 206. These sensors 201–206 are well known in the art and may take any known type. According to these signals indicating driving conditions and driver's demands, the controller 200 controls operation of the solenoid valves 67–69, 85, 89, 91 and 95.

Figure 4:
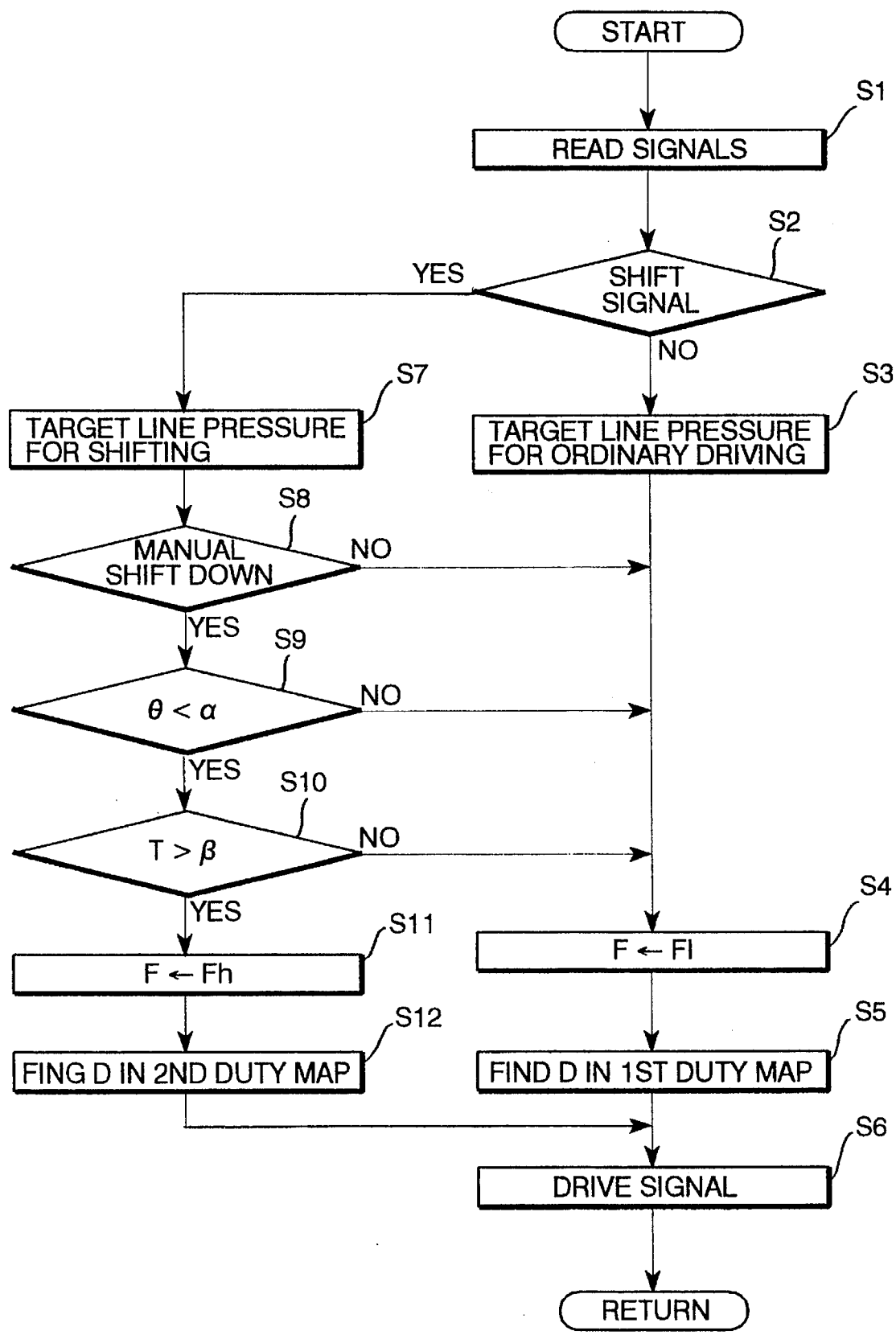
FIG. 4 is a flow chart of the sequence routine of operation of a second duty solenoid valve for controlling line pressure.
Figure 8:
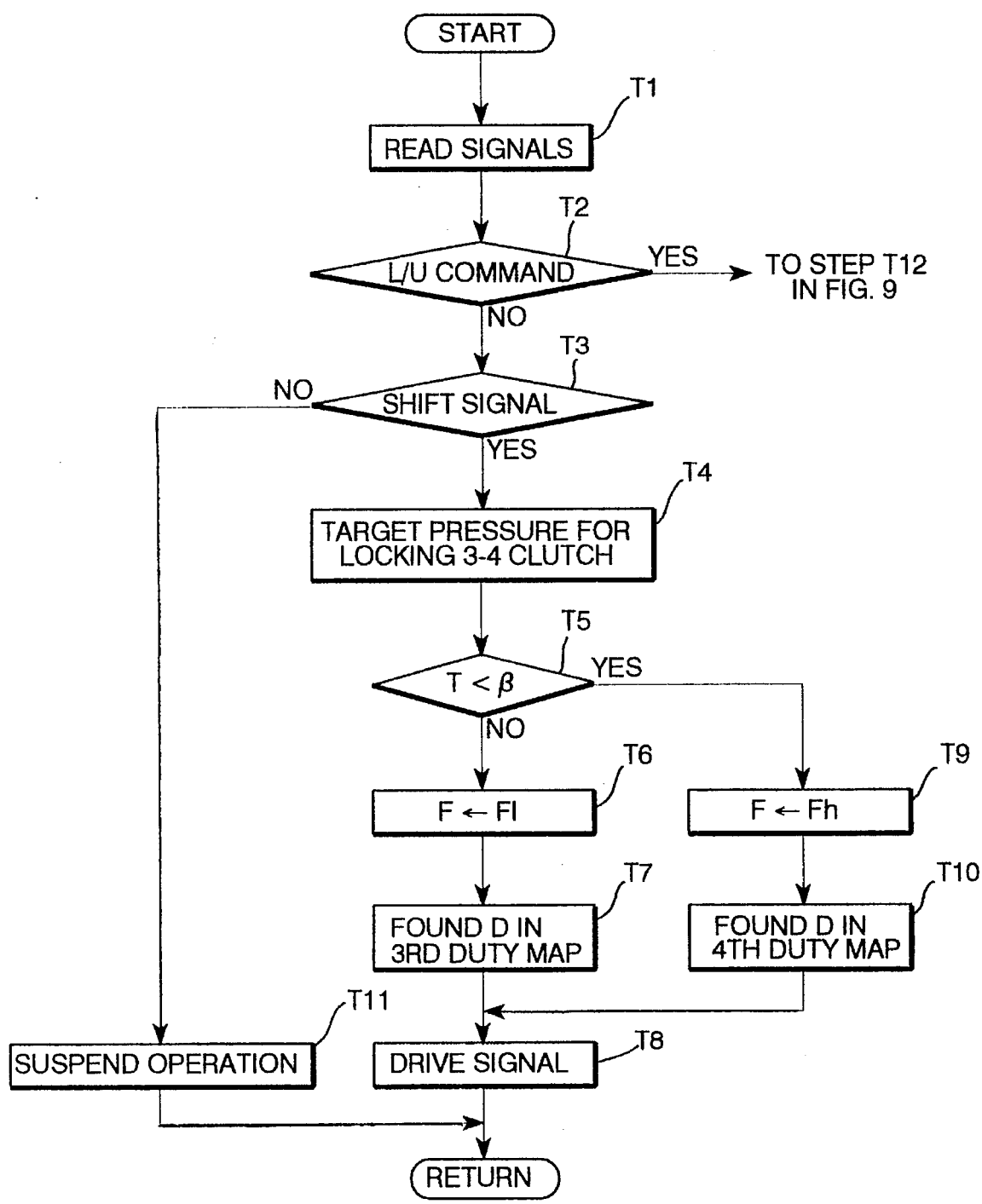
FIGS. 8 and 9 are a flow chart of the sequence routine of operation of a first duty solenoid valve for controlling line pressure to be supplied to the lock-up control valve.
Figure 9:
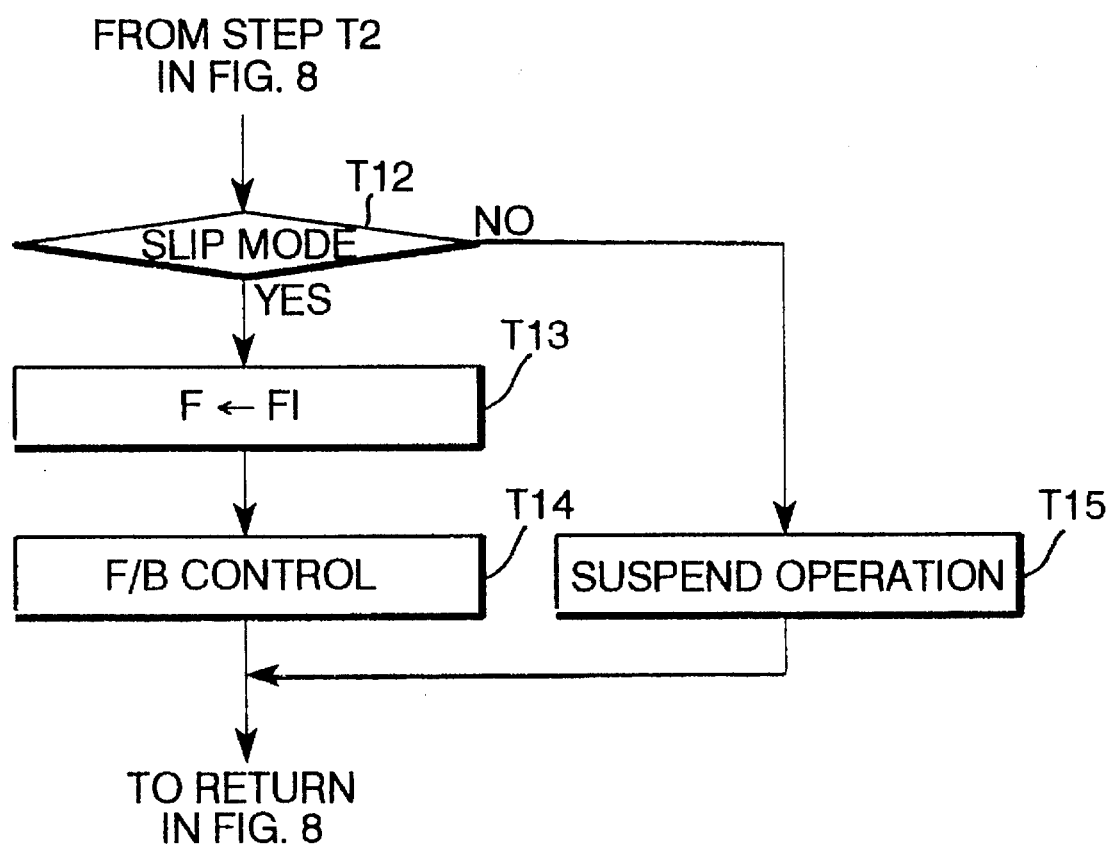

Specifically, the operation of the first and second duty solenoid valves 89 and 91 will be best understood by reviewing FIGS. 4, 8 and 9, which are flow charts illustrating control routines for the microcomputer of the controller 200. Programming a computer is a skill well understood in the art. The following description is written to enable a programmer having ordinary skill in the art to prepare an appropriate program for the microcomputer. The particular details of any such program would of course depend upon the architecture of the particular computer selected.

Figure 5:
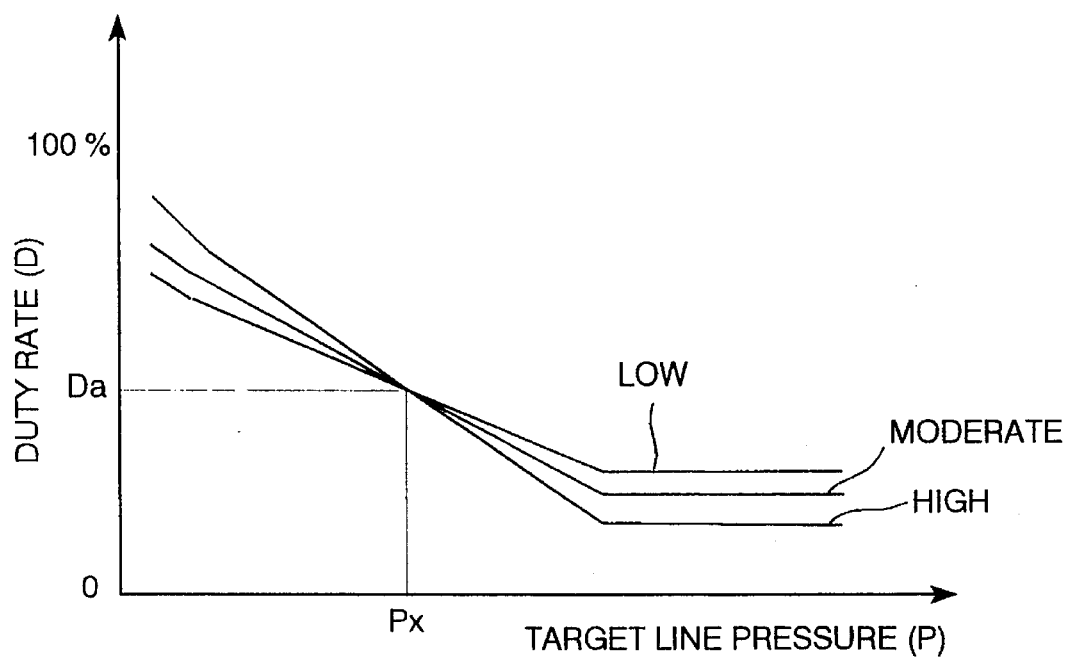
FIG. 5 is an illustration showing a first duty rate map for low control frequency.

FIG. 4 is a flow chart of the sequence routine of operation of the second duty solenoid valve 91 for controlling line pressure. The flow chart logic commences and control passes directly to a function block at step S1 where various signals are read in. At step S2, a decision is made as to whether a shift signal is provided from the position sensor 208 as a result of shifting the automatic transmission 10. If the answer to the decision is "NO," then, a target line pressure for ordinary driving is established at step S3. In this instance, such an ordinary driving target line pressure is determined by making use of throttle opening θ as a parameter. Subsequently, a drive frequency F at which the second duty solenoid valve 91 is operated is determined at step S4. The drive frequency F for ordinary driving is set to, for instance, a specific low frequency F1, such as 35 Hz. At step S5, a duty rate D is found according to target line pressure and working oil temperature with reference to a first duty rate map shown in FIG. 5. As apparent from FIG. 5, the first duty rate map defines the duty rate D such that the duty rate D becomes higher with an increase in target line pressure and that it is higher for higher temperatures of working oil than for lower temperatures of working oil in a pressure range in which the target line pressure P is lower than a predetermined target line pressure Px and conversely lower for higher temperatures of working oil than for lower temperatures of working oil in a pressure range in which the target line pressure P is higher than the predetermined target line pressure Px. At step S6, the controller 200 provides for the second duty solenoid valve 91 a drive pulse signal having a pulse width modulated according to the duty rate D.

Figure 6:
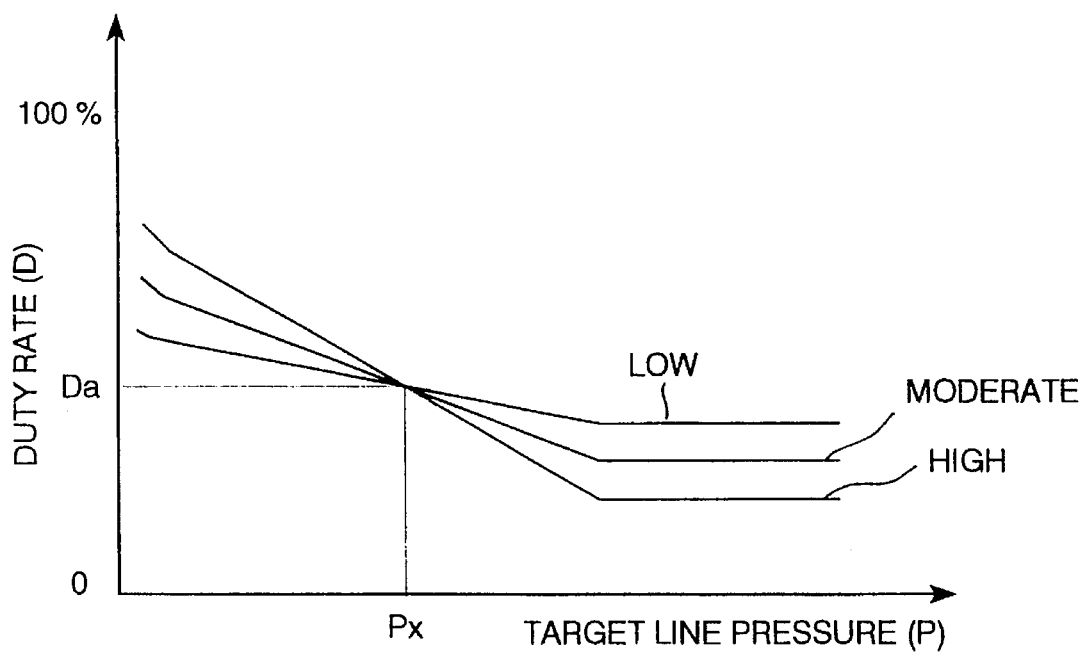
FIG. 6 is an illustration showing a second duty rate map for high control frequency.

On the other hand, if the answer to the decision concerning a shift signal made at step S2 is "YES," then, a target line pressure for shifting is established at step S7. In this instance, the shifting target line pressure is determined by making use of throttle opening θ, vehicle speed V and engine speed Ne as parameters. Subsequently, a decision is made at step S8 as to whether the shifting has been made by manually operating a shift lever so as to shift down the automatic transmission 10. If the answer to the decision is "YES," another decision is made at step S9 as to whether the throttle opening θ is smaller than a predetermined value α which represents fully closed throttle, i.e. whether a manual shift-down has been made while the accelerator is released. If the answer to the decision is "YES," a decision is subsequently made at step S10 as to whether the temperature T of working oil is higher than a predetermined temperature β. If the answer to the decision is "YES," then, the drive frequency F for shifting is set to, for instance, a specific high frequency Fh, such as 70 Hz at step S11. At step S12, the duty rate D is found according to target line pressure and working oil temperature with reference to a second duty rate map shown in FIG. 6. As apparent from FIG. 6, the duty rate D is defined to be higher in the second duty rate map than in the first duty rate map shown in FIG. 5 in the pressure range of target line pressure P higher than the predetermined target line pressure Px and to be lower in the second duty rate map than in the first duty rate map in the pressure range of target line pressure P lower than the predetermined target line pressure Px. The reason why the different duty rate maps are selectively used for the second solenoid valve 91 is to avoid the dependency of output pressure upon frequency. That is, when the duty rate D is lowered so as to increase the period of closing the drain port, an increased drive frequency F causes the solenoid plunger to act with reduced responsiveness, so as to lower the rate of discharging working oil of the second duty solenoid valve 91. Consequently, the second duty solenoid valve 91 provides output pressure higher when operated at an increased drive frequency F than when operated at a not increased drive frequency F. Conversely, when the duty rate D is increased so as to shorten the period of closing the drain port, the second duty solenoid valve 91 provides output pressure lower when operated at an increased drive frequency F than when operated at a not increased drive frequency F.

Thereafter, at step S6, the controller 200 provides for the second duty solenoid valve 91 a drive pulse signal having a pulse width modulated according to the duty rate D.

If the answer to any one of the decisions made at steps S8–S10, the drive frequency F is set to the specific low frequency F1 for ordinary driving at step S4.

Figure 7:
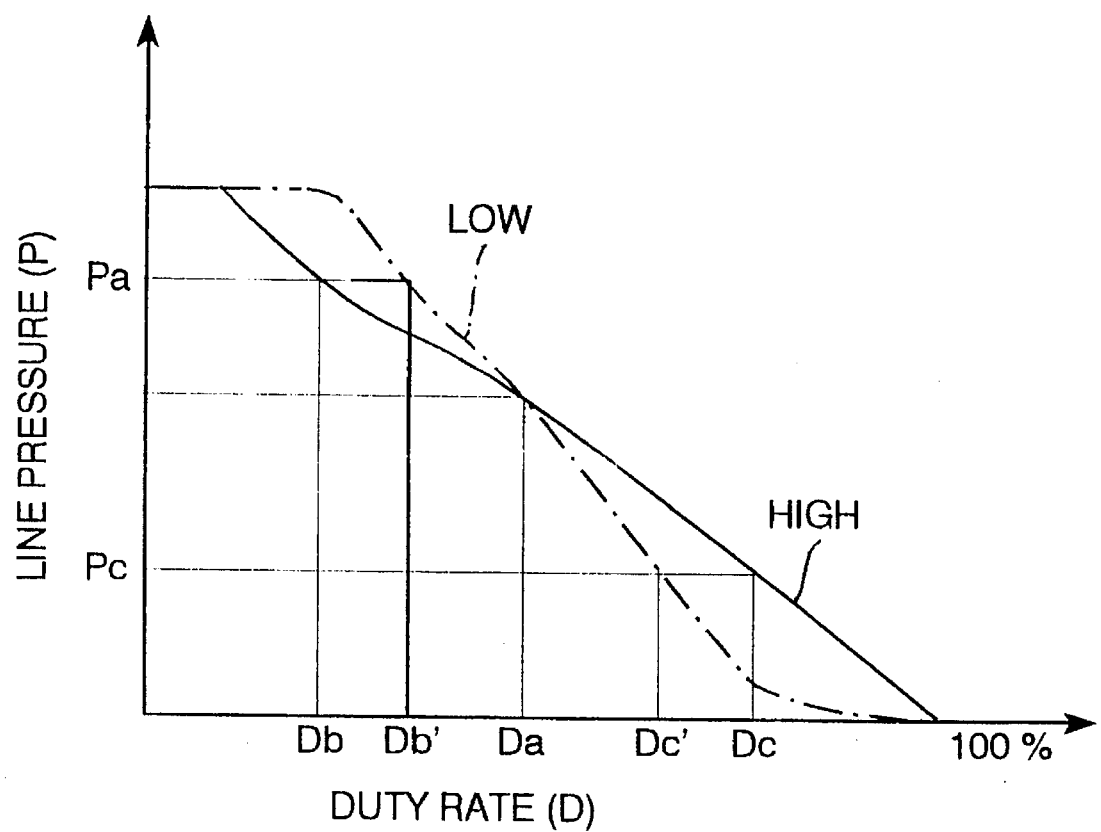
FIG. 7 is a diagram showing line pressure control characteristics of the duty solenoid valve.

As shown in FIG. 7, when a high level of controlled line pressure Pa is given for a duty rate Db less than the specific duty rate Da corresponding to the predetermined target line pressure Px at higher oil temperatures, a duty rate Db' is substituted for the duty rate Db in order to provide the same level of controlled line pressure Pa for lower oil temperatures, Similarly, when a controlled line pressure Pc is given for a duty rate Dc greater than the specific duty rate Da at higher oil temperatures, a duty rate Dc' is substituted for the duty rate Dc in order to provide the same level of controlled line pressure Pa for lower oil temperatures. Consequently, the line pressure is controlled to reach a given target line pressure in spite of oil temperatures. In particular, in a manually conducted down-shift, the drive frequency F is increased when the temperature of working oil is higher than the predetermined temperature β, so as not only to control pulsations of line pressure, preventing the coast clutch 42 in a hydraulic circuit not having an accumulator from causing judder during locking, but also to provide a coupling pressure meeting a desired pressure, enabling the coast clutch 42 to be locked without shocks in excess.

FIGS. 8 and 9 are a flow chart of the sequence routine of operation of the first duty solenoid valve 89 for controlling pressure to be supplied to the lock-up control valve 84.

Figure 10:
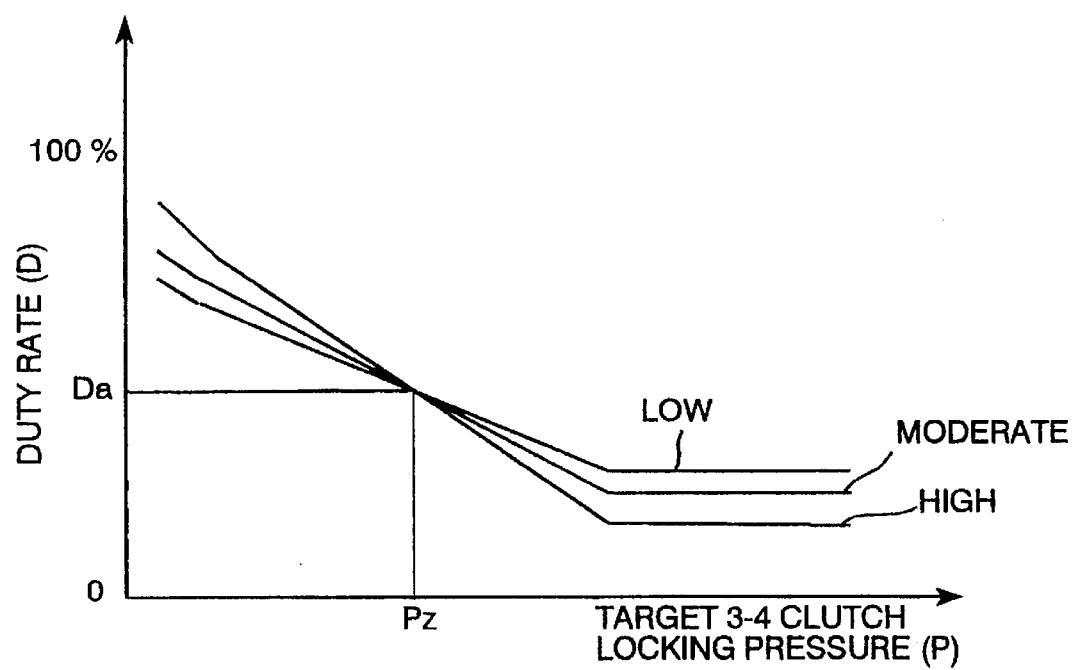
FIG. 10 is an illustration showing a third duty rate map for low control frequency.

The flow chart logic commences and control passes directly to a function block at step T1 where various signals are read in. At step T2, a decision is made as to whether a lock-up command (L/U) signal is provided. If the answer to the decision is "NO," then, another decision is made at step T3 as to whether a shift signal is provided from the position sensor 208 as a result of shifting the automatic transmission 10. If the answer to the decision is "YES," then, a target locking pressure for the 3–4 clutch 43 is established at step T4. In this instance, such a 3–4 clutch target locking pressure is determined by making use of throttle opening θ and turbine speed Nt as parameters. A decision is subsequently made at step T5 as to whether the temperature of working oil T is higher than the predetermined temperature β. If the answer to the decision is "NO," then, the drive frequency F is set to the specific low frequency F1 at step T6. At step T7, the duty rate D is found according to target locking pressure P and working oil temperature T with reference to a third duty rate map shown in FIG. 10. The third duty rate map defines the duty rate D such that the duty rate D becomes higher with an increase in locking pressure and that it is higher for higher temperatures of working oil than for lower temperatures of working oil in a pressure range in which the target locking pressure P is lower than a predetermined target locking pressure Pz and conversely lower for higher temperatures of working oil than for lower temperatures of working oil T in a pressure range in which the target locking pressure P is higher than the predetermined target locking pressure Pz.

Figure 11:
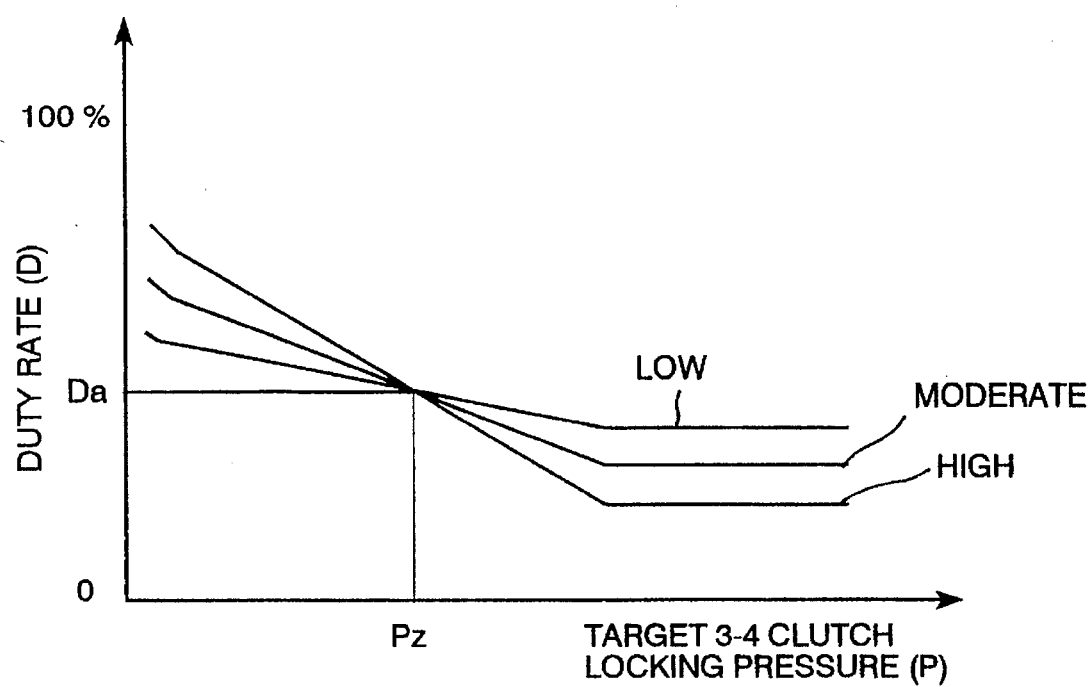
FIG. 11 is an illustration showing a forth duty rate map for high control frequency.
Figure 12:
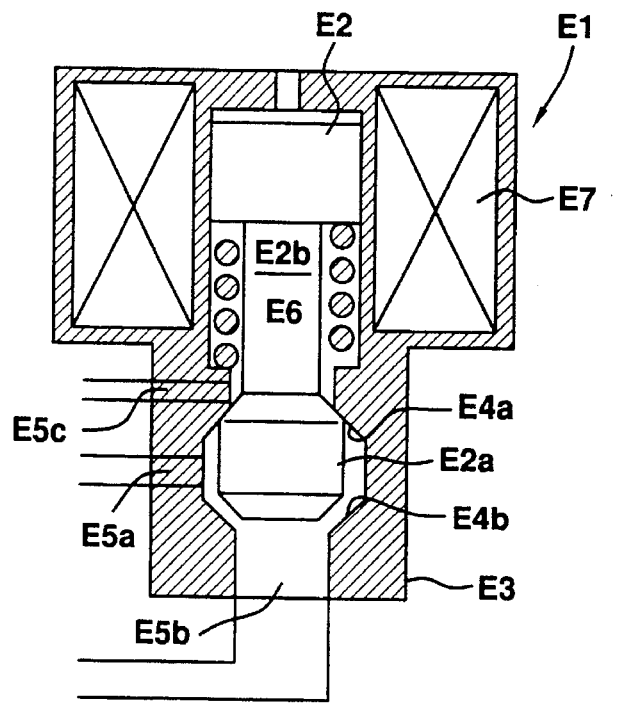
FIG. 12 is a diagrammatic illustration showing a three-way type of duty solenoid valve.
Figure 13:
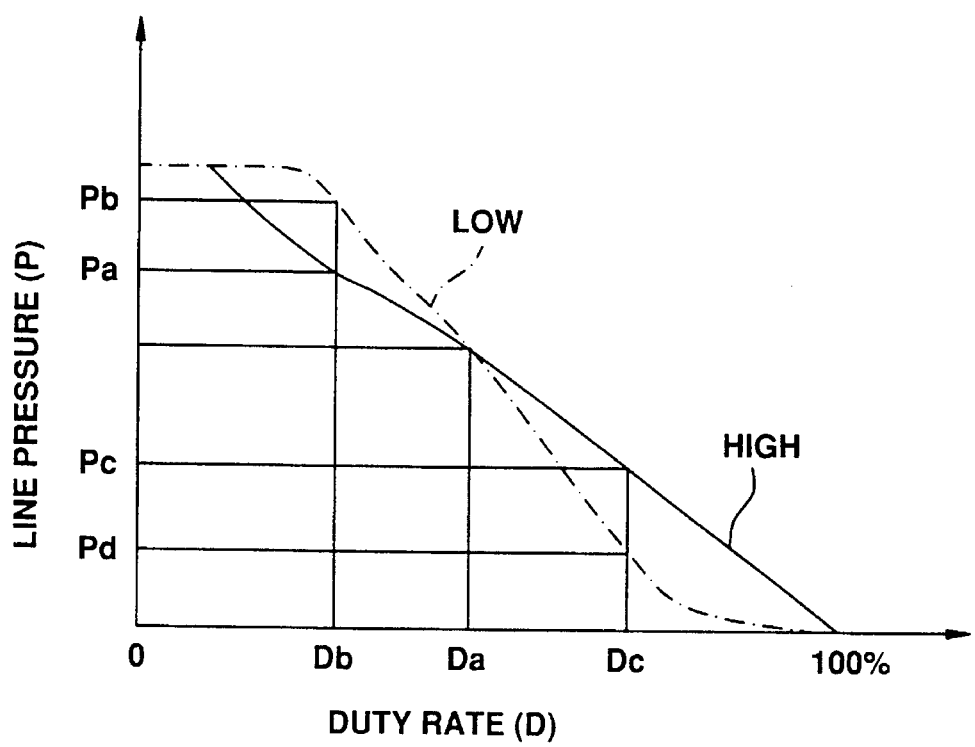
FIG. 13 is a diagram showing line pressure control characteristics of the prior art duty solenoid valve.

If the answer to the decision concerning the temperature of working oil T is "YES," then, the drive frequency F is set to the specific high frequency Fh at step T9 and, subsequently at step T10, the duty rate D is found according to target locking pressure and working oil temperature T with reference to a forth duty rate map shown in FIG. 11. As apparent from FIG. 11, the duty rate D is defined to be higher in the forth duty rate map than in the third duty rate map shown in FIG. 10 in the pressure range of target line pressure P higher than the predetermined target line pressure Pz and to be lower in the second duty rate map than in the first duty rate map in the pressure range of target line pressure P lower than the predetermined target line pressure Pz. After the determination of duty rate D at step T7 or T10, the controller 200 provides for the first duty solenoid valve 89 a drive pulse signal having a pulse width modulated according to the duty rate D at step T8.

On the other hand, if the answer to the decision made at step T3 is "NO," this indicates that the automatic transmission 10 has not shifted, then, the first duty solenoid valve 89 is suspended in operation at step T11.

Referring to FIG. 9, if the answer to the decision concerning the provision of a lock-up command signal made at step T2 is "YES," another decision is made at step T12 as to whether the driving condition is in a slipping mode based on various speeds including, for instance, vehicle speed and turbine speed. If the answer to the decision is "YES," then, the drive frequency F is set to the specific low frequency F1 at step T13 and the duty rate D is feedback controlled at step T14. In the feedback control, the duty rate D is controlled so that the difference of a turbine speed Nt from an engine speed Ne reaches a predetermined value. On the other hand, if the answer to the decision made at step T12 is "NO," i.e. the driving condition is not in the slipping mode, then, the first duty solenoid valve 89 is suspended in operation at step T15.

Because the locking pressure for the 3–4 clutch 43 is preferably regulated by changing the drive frequency F for the first duty solenoid valve 89 to the specific high frequency Fh when the temperature of working oil T is higher than the predetermined temperature β from the specific low frequency F1 which is taken when the temperature of working oil T is lower than the predetermined temperature β, pulsation of locking pressure for the 3–4 clutch are controlled, preventing the 3–4 clutch from causing judder during locking. In order for the coast clutch 42 to be more effectively prevented from shocks during manual down-shifts, the first duty solenoid valve 89 may be controlled to provide locking pressure changing with a flat transitional portion. It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A hydraulic control system for an automatic transmission, said hydraulic control system including a three-way type of solenoid valve which is operated with a drive signal depending upon driving conditions to open and close a drain port of said valve so as to regulate hydraulic pressure introduced at an input port of said valve and develop a controlled pressure at an output port of said valve leading to a frictional coupling element hydraulically connected to said solenoid valve for shifting the automatic transmission to a specific one of a plurality of gears, thereby forcing said controlled pressure to reach a desired hydraulic pressure according to driving conditions, said hydraulic control system comprising:

a hydraulic pressure control circuit including a hydraulic pressure source for supplying a working oil as a hydraulic pressure to said input port of said solenoid valve from said hydraulic pressure source;

detection means for detecting a parameter relating to a viscosity of said working oil for defining fluidity of said working oil; and control means for changing said drive signal so as to change a period of time for which said drain port remains closed, in a range of said desired hydraulic pressure greater than a predetermined pressure, longer when said detection means detects said parameter indicating that the viscosity of said working oil is higher than a specific value of viscosity than when said detection means detects said parameter indicating that the viscosity of said working oil is lower than said specific value of viscosity.

2. A hydraulic control system as defined in claim 1, wherein said detection means detects temperature of said working oil as said parameter.

3. A hydraulic control system as defined in claim 2, wherein said detection means detects high, moderate and low ranges of temperature of said working oil as said parameter.

4. A hydraulic control system as defined in claim 1, wherein said solenoid valve is hydraulically connected to a lock-up clutch of a torque converter of said automatic transmission.

5. A hydraulic control system including a three-way type of solenoid valve which is operated with a drive signal depending upon driving conditions to open and close a drain port of said solenoid valve so as to regulate hydraulic pressure introduced therein and develop a controlled pressure at a desired level and discharge said controlled pressure therefrom, said hydraulic control system comprising:

a hydraulic pressure circuit including a hydraulic pressure source for supplying a working oil as a hydraulic pressure to said solenoid valve from said hydraulic pressure source;

detection means for detecting a parameter relating to a viscosity of said working oil for defining fluidity of said working oil; and control means for changing said drive signal so as to change a period of time, for which said drain port remains closed, in a range of said desired hydraulic pressure greater than a predetermined pressure, longer when said detection means detects said parameter indicating that the viscosity of said working oil is higher than a specific value of viscosity than when said detection means detects said parameter indicating that the viscosity of said working oil is lower than a specific value of viscosity.

6. A hydraulic control system as defined in claim 5, wherein said drive signal periodically energizes and deenergizes said solenoid valve so as to connect communication of an output port alternatively with an input port and said drain port.

7. A hydraulic control system as defined in claim 5, wherein said drive signal periodically energizes said solenoid valve so as to connect communication of an output port with both an input port and said drain port.

8. A hydraulic control system as defined in claim 5, wherein said drive signal periodically energizes and deenergizes said solenoid valve so as to connect communication of an output port with an input port and simultaneously to disconnect communication of said output port with said drain port.

9. A hydraulic control system including a three-way type of solenoid valve which is operated with a drive signal depending upon driving conditions to open and close a drain port of said solenoid valve so as to regulate hydraulic pressure introduced therein and develop a controlled pressure at a desired level and discharge said controlled pressure therefrom, said hydraulic control system comprising:

a hydraulic pressure circuit including a hydraulic pressure source for supplying a working oil as a hydraulic pressure to said solenoid valve from said hydraulic pressure source;

detection means for detecting a parameter relating to a viscosity of said working oil for defining fluidity of said working oil; and control means for changing said drive signal so as to change a period of time, for which said drain port remains closed in a range of said desired hydraulic pressure greater than a predetermined pressure, longer when said detection means detects said parameter indicating that the viscosity of said working oil is higher than a specific value of viscosity than when said detection means detects said parameter indicating that the viscosity of said working oil is lower than a specific value of viscosity.

10. A hydraulic control system as defined in claim 9, wherein said drive signal periodically energizes and deenergizes said solenoid valve so as to connect communication of an output port alternatively with and input port and said drain port.

11. A hydraulic control system as defined in claim 9, wherein said drive signal periodically energizes said solenoid valve so as to connect communication of an output port with both an input port and said drain port.

12. A hydraulic control system as defined in claim 9, wherein said drive signal periodically energizes and deenergizes said solenoid valve so as to connect communication of an output port with an input port and simultaneously to disconnect communication of said output port with said drain port.

* * * * *